United States Patent
Teshima et al.

(10) Patent No.: US 7,589,444 B2
(45) Date of Patent: Sep. 15, 2009

(54) BRUSHLESS MOTOR AND COOLING FAN

(75) Inventors: Hiroyoshi Teshima, Kyoto (JP); Koji Muraoka, Kyoto (JP); Akira Saiga, Kyoto (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 12/258,668

(22) Filed: Oct. 27, 2008

(65) Prior Publication Data

US 2009/0108716 A1    Apr. 30, 2009

(30) Foreign Application Priority Data

Oct. 31, 2007    (JP)    ............... 2007-282642

(51) Int. Cl.
  *H02K 11/00*    (2006.01)
(52) U.S. Cl. ................... 310/68 B; 310/67 R
(58) Field of Classification Search ............... 310/68 B, 310/67 R; 360/98.07, 99.04, 99.08
See application file for complete search history.

(56) References Cited

U.S. PATENT DOCUMENTS 5,469,005 A * 11/1995 Asama et al. ............. 310/68 B
6,856,054 B2 * 2/2005 Shukuri et al. ............ 310/68 B

FOREIGN PATENT DOCUMENTS

| JP | 08-308181 A | 11/1996 |
| JP | 09-084322 A | 3/1997 |
| JP | 09-215296 A | 8/1997 |
| JP | 3431245 B2 | 7/2003 |

* cited by examiner

*Primary Examiner*—Quyen Leung
*Assistant Examiner*—Leda Pham
(74) *Attorney, Agent, or Firm*—Keating & Bennett, LLP

(57) ABSTRACT

A rotor unit of a brushless motor includes a substantially cylindrical rotor magnet and a rotor holder arranged to retain an outer circumferential portion of the rotor magnet. A stator unit of the same includes a stator core around which coils are wound and a Hall IC for sensing magnetic flux generated from the rotor magnet. The stator core includes teeth disposed at positions separated in the circumferential direction, each of which has an arm portion extending outward in the radial direction around which the coil is wound, and a stretching portion extending from the arm portion outward in the radial direction and in the circumferential direction on both sides. A sensor element included in the Hall IC is positioned in the range within a lead angle of about four degrees or less as a mechanical angle in the circumferential direction from a line connecting radially the central axis and a point bisecting a line connecting neighboring stretching portions, and within a distance of about one millimeter or smaller outward in the radial direction from an arc connecting outer edges of the neighboring stretching portions.

8 Claims, 9 Drawing Sheets

BRUSHLESS MOTOR AND COOLING FAN

BACKGROUND OF THE INVENTION

1. Field of the Invention

The present invention relates to a brushless motor and a cooling fan. More specifically, the present invention relates to a layout of a position sensor such as a Hall device or a Hall IC that is used for sensing a magnetic pole position of a rotor in the brushless motor.

2. Description of Related Art

In accordance with a small size and a slim shape of recent electronic equipment, a cooling fan to be used for the equipment is also required to have a small size and a slim shape. In particular, a slim fan having a thickness in the axial direction of 15 millimeters or smaller has little margin in the axial dimension, so it is difficult to secure a space between an end surface of the stator core and the Hall device or the Hall IC. Since the Hall device or the Hall IC senses a magnetic field (or a magnetic flux) generated by a rotor magnet, it is preferable that a distance between the rotor magnet and the Hall device or the Hall IC be small. However, if a distance between the stator core and the Hall device or the Hall IC becomes small, the magnetic field generated by the rotor magnet becomes difficult to sense. A reason for this is considered that the magnetic flux generated by the rotor magnet is attracted strongly to the stator core side so that (leakage) magnetic flux to the Hall device or the Hall IC is weakened.

In particular, if the current that is supplied to a stator coil increases along with an increase in a rotation speed of an impeller of the cooling fan, the magnetic field generated by the rotor magnet is further attracted strongly toward the stator core side. As a result, the Hall device or the Hall IC may not capable of sensing the magnetic field from the rotor magnet correctly. Consequently, the rotation of the impeller may be stopped.

SUMMARY OF THE INVENTION

Preferred embodiments of the present invention provide a brushless motor and a cooling fan, in which a relative position of the Hall device or the Hall IC with the stator core as well as with the rotor magnet is optimized.

A brushless motor according to a first preferred embodiment of the present invention includes a stator unit disposed around a central axis, a rotor unit disposed in a rotatable manner relatively to the stator unit so as to rotate around the central axis, the rotor unit including a substantially cylindrical rotor magnet and a rotor holder having a cylindrical portion arranged to retain an outer circumferential portion of the rotor magnet, the stator unit including a stator core around which coils are wound and a circuit board on which circuit components defining a circuit for supplying drive current to the coils are mounted, the circuit board including a position sensor arranged to sense a change in magnetic flux due to rotation of the rotor magnet, and the stator core includes teeth disposed at positions separated in the circumferential direction, each of which has an arm portion extending outward in the radial direction from the central axis, around which the coil is wound, and a stretching portion extending from the arm portion outward in the radial direction and in the circumferential direction on both sides. The position sensor includes a sensor element that is positioned in the range within the lead angle of about four degrees or less in the circumferential direction from a reference line radially connecting the central axis and a point bisecting a line connecting neighboring stretching portions in the circumferential direction as a shortest distance, and within a distance of about one millimeter or less outward in the radial direction from an arc connecting outer edges of the neighboring stretching portions with respect to the central axis.

Here, the sensor element included in the position sensor means a portion (or a point) that actually senses a magnetic field in a position sensor such as a Hall device or a Hall IC housed in a package having a certain size. As to a Hall device, for instance, it means the core portion thereof that senses the magnetic field of the rotor magnet by the Hall effect. As to a Hall IC, it means the core portion of the Hall device embedded in the Hall IC. In addition, the "lead angle" means an angle (not an electric angle but a mechanical angle) leading from the reference line in the direction (phase leading direction) opposite to the rotation direction of the rotor magnet.

If the positional relationship between the position sensor (the sensor element included therein) and the stator core viewed from the axial direction is determined as described above, a rotational position of the rotor can be sensed correctly so that the rotational control of the motor can be performed normally. Specific data to constitute grounds for the determination of the positional relationship will be described later.

In a second preferred embodiment of the present invention, the number of the teeth preferably is four, for example.

In a third preferred embodiment of the present invention, a difference between an end surface of the rotor magnet in the axial direction on the position sensor side and an end surface of the stator core in the axial direction on the position sensor side is preferably about two millimeters or less.

The effects and advantages of preferred embodiments of the present invention are achieved particularly in the case where the end surface of the stator core in the axial direction is close to the sensor element of the position sensor for satisfying a request for a slim fan, i.e., where a difference between an end surface of the rotor magnet in the axial direction on the position sensor side and an end surface of the stator core in the axial direction on the position sensor side is about two millimeters or less.

In a fourth preferred embodiment of the present invention, the end surface of the rotor magnet in the axial direction on the position sensor side is closer to the position sensor than the end surface of the stator core in the axial direction on the position sensor side is.

In a fifth preferred embodiment of the present invention, a distance between the end surface of the rotor magnet in the axial direction on the position sensor side and the sensor element of the position sensor is about two millimeters or less.

If the positional relationship between the sensor element of the position sensor and the rotor magnet in the axial direction is determined as described above in addition to the positional relationship between the sensor element of the position sensor and the stator core viewed from the axial direction, the rotational position of the rotor can be sensed more accurately and correctly so that the rotational control of the motor can be performed normally. Specific data to constitute grounds for the determination of the positional relationship will be described later.

In a sixth preferred embodiment of the present invention, a Hall device or a Hall IC in which the Hall device is embedded is used as the position sensor. Other than that, a motor drive IC (with an embedded Hall device) may be used, which includes a Hall device, a signal amplifying circuit, a waveform shaping circuit, switching circuit and the like. Alternatively, other magnetic types of position sensors such as an MR (Magneto-Resistance effect) sensor may be used.

A cooling fan according to a seventh preferred embodiment of the present invention includes a brushless motor as described above, an impeller fixed to an outer surface of the rotor holder, and a housing including a base portion arranged to support an end of the brushless motor in the axial direction and a cylindrical portion surrounding the impeller.

In an eighth preferred embodiment of the present invention, the cooling fan is a slim fan having a dimension in the axial direction of about 15 millimeters or less.

According to the brushless motor and the cooling fan of various preferred embodiments of the present invention, a positional relationship between the position sensor (the Hall device or the Hall IC) and the stator core, and further a positional relationship among three members including the rotor magnet can be optimized, so that the rotational control can be performed normally even if the rotation speed of the motor (and the impeller) is increased.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to the attached drawings.

Figure 1:
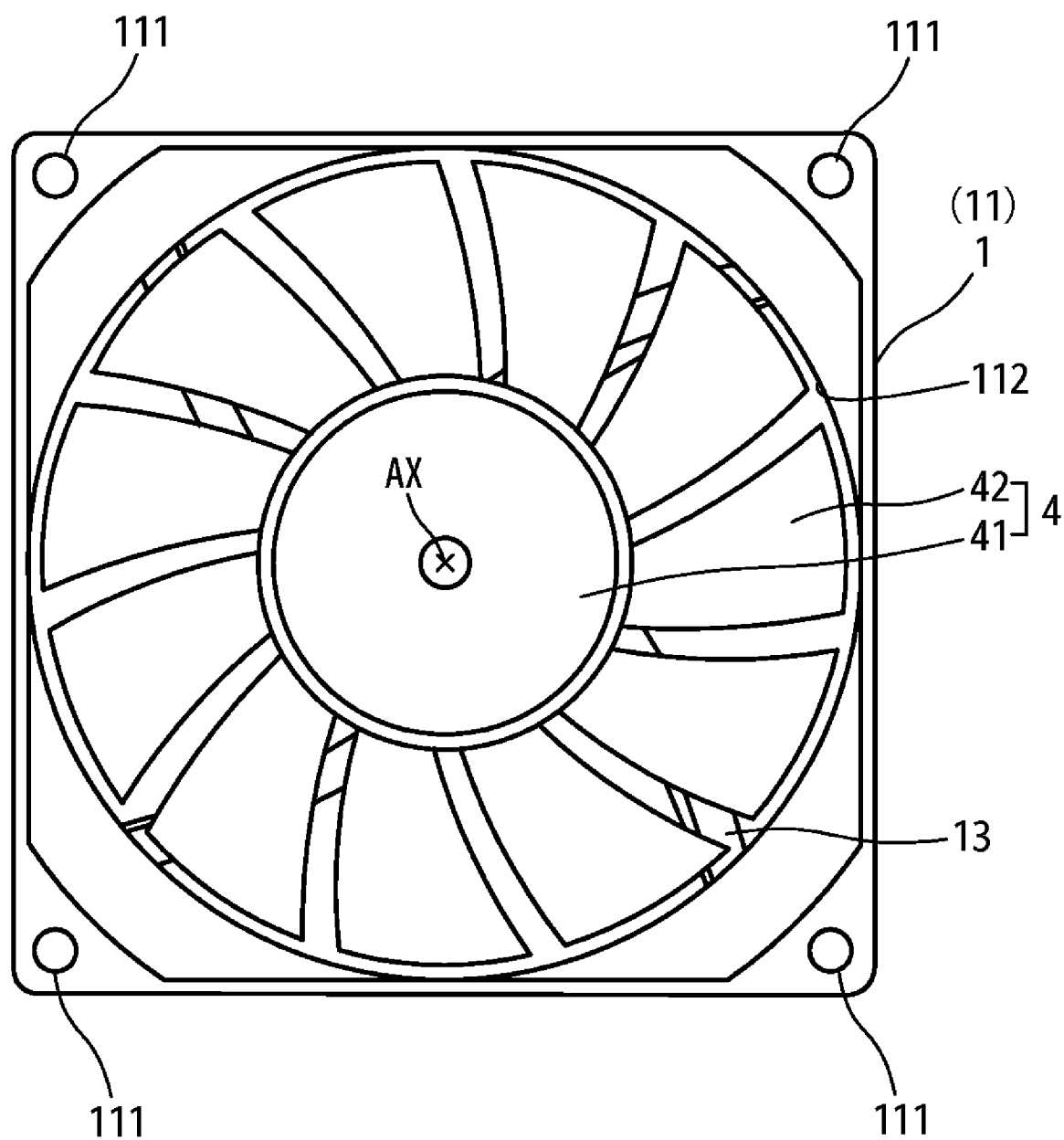
FIG. 1 is a schematic plan view of a cooling fan using a brushless motor according to a preferred embodiment of the present invention.
Figure 2:
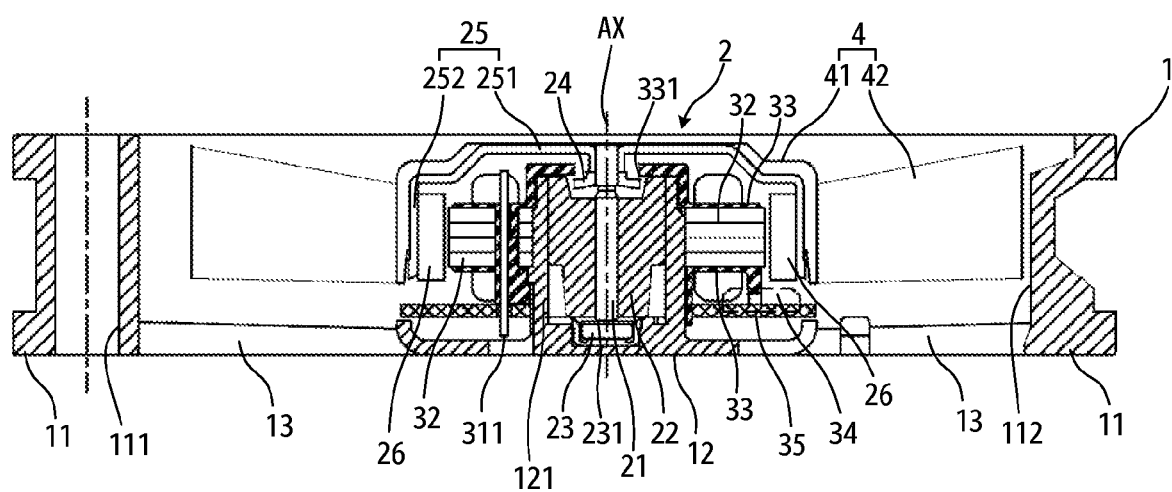
FIG. 2 is a schematic cross section of the cooling fan according to a preferred embodiment of the present invention.

FIG. 1 is a schematic plan view of a cooling fan using a brushless motor according to a preferred embodiment of the present invention, and FIG. 2 is a schematic cross section of the cooling fan. This cooling fan is an axial fan including a brushless motor 2 and an impeller 4 housed in a housing 1 that is a resin molded part. It is a slim fan having a dimension of about 15 millimeters or less in the direction along the central axis AX, which is a thickness of the housing 1. It also has an outer shape that is preferably substantially square as viewed from the top, each side of which is approximately 60 millimeters.

The housing 1 includes a cylindrical portion 11 having a substantially circular inner surface and a substantially square outer shape as viewed from the top, a base portion 12 having a substantially circular shape viewed from the top located in the middle of the cylindrical portion 11, and a plurality of (e.g., four) connecting portions (stationary blades in this embodiment, but they may be ribs) 13. There are preferably four through holes 111 on the four corners of the cylindrical portion 11 viewed from the top, through which bolts pass for attaching the cooling fan to electronic equipment. The inner surface 112 of the cylindrical portion 11 having a circular or substantially circular shape as viewed from the top is a substantially cylindrical inner surface opposed to an outer edge of the impeller 4 with a predetermined gap, and it constitutes a duct for air flowing in the axial direction when the impeller 4 rotates. Note that the housing 1 is not limited to the resin molded part but may be molded by an aluminum die casting process. In addition, the cylindrical portion 11, the base portion 12 and the connecting portion 13 of the housing 1 are preferably formed as a single piece by injection molding of plastic or by the aluminum die casting process.

The base portion 12 of the housing 1 is supported by the plurality of connecting portions 13 at the middle inside the cylindrical portion 11, and an end in the axial direction of the brushless motor 2 is supported by the base portion 12. More exactly, a cylindrical portion 121 having the central axis AX stands at the center of the base portion 12, which houses a sleeve bearing 22 arranged to retain a rotating shaft 21 of the brushless motor 2 (and the impeller 4) in a rotatable manner and a thrust pivot bearing including a thrust chip magnet 23 and a thrust plate 231. The thrust chip magnet 23 attracts the rotating shaft 21 to the proximal end side by a magnetic attraction force, so that a movement of the rotating shaft 21 toward the distal end side is regulated. In this description, the proximal end side in the direction along the central axis AX (in the axial direction) means the side where the base portion 12 and the connecting portions 13 of the housing 1 are located while the distal end side means the opposite side.

A dropout protection ring 24 arranged to regulate a movement of the rotating shaft 21 toward the distal end side in the axial direction is fixed to the rotating shaft 21 at the distal end portion, and further distal end side of the rotating shaft 21 is fixed to a rotor holder 25 made of steel (e.g., stainless steel). The rotor holder 25 includes a disk portion 251 extending radially from the center portion fixed to the rotating shaft 21 and a cylindrical portion 252 extending axially from the outer circumferential edge of the disk portion 251 toward the proximal end side. The outer surface of a substantially cylindrical rotor magnet 26 is fixed to the inner surface of the cylindrical portion 252 and is retained by the same. The rotor magnet 26 is magnetized in four magnetic poles.

The impeller 4 is fixed to the outer surface of the rotor holder 25 (the outer circumferential surface and the surface of the distal end side). The impeller 4 is a resin molded part including a cylindrical portion 41 that covers the outer surfaces of the disk portion 251 and the cylindrical portion 252 of the rotor holder 25, and a plurality of (eleven in the example shown in FIG. 1) blades 42 extending radially from the outer circumferential surface of the cylindrical portion 41.

Figure 3:
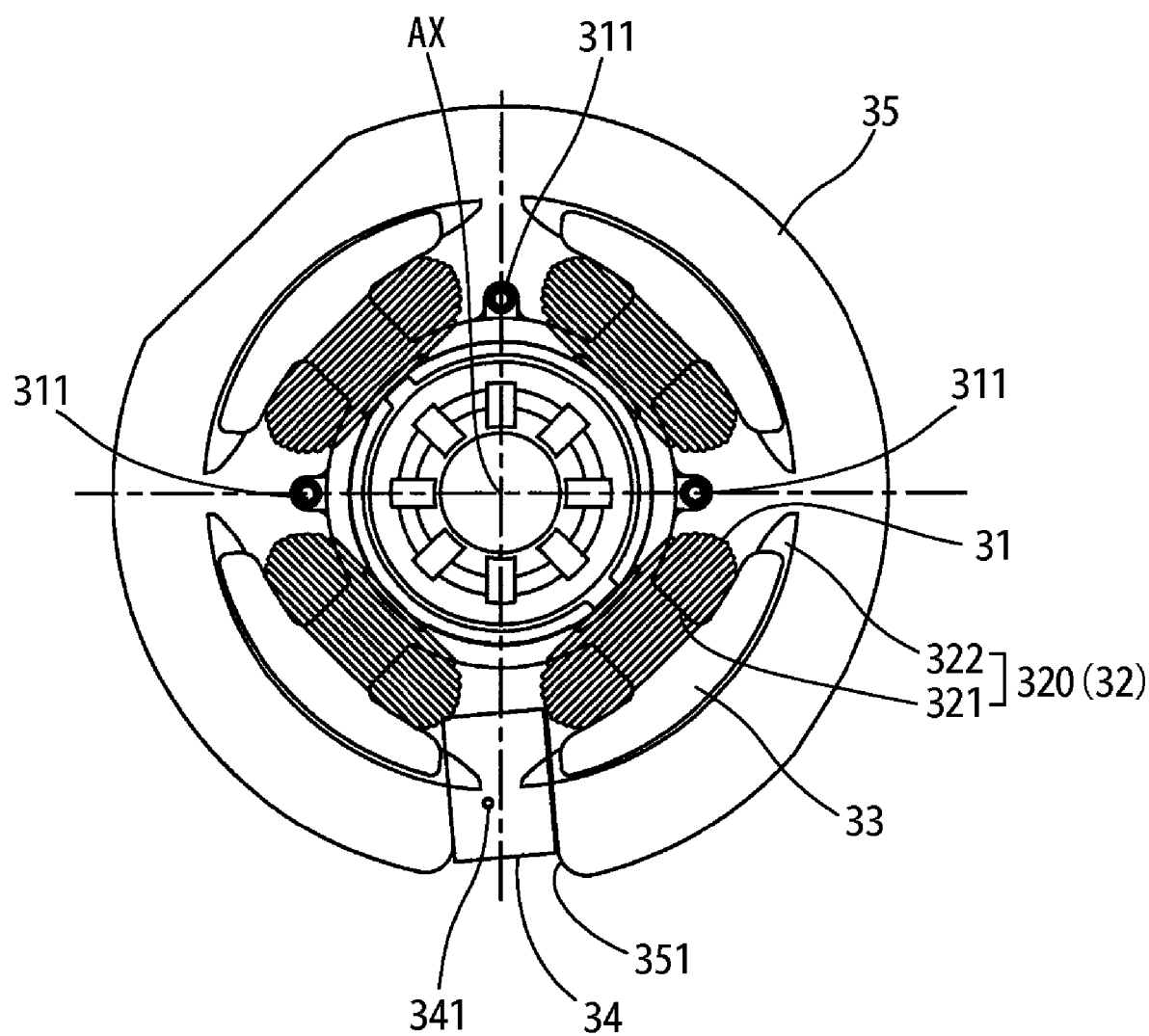
FIG. 3 is a plan view of a stator unit constituting the brushless motor, which is viewed from a distal end in the axial direction.

Next, a structure of the brushless motor 2 will be described with reference to FIGS. 2 and 3. FIG. 3 is a plan view of the stator unit of the brushless motor 2 viewed from the distal end side in the axial direction. The brushless motor 2 includes a stator unit having the central axis AX and a rotor unit that rotates around the central axis AX.

The rotor unit includes the rotor magnet 26 having a substantially cylindrical shape as described above and the rotor holder 25 having the cylindrical portion 252 retaining the outer circumferential portion of the rotor magnet 26. The stator unit includes a stator core 32 around which coils 31 are wound, and a Hall IC 34 as a position sensor arranged to sense a change in magnetic flux when the rotor magnet 26 rotates.

The stator core 32 includes four teeth (pole teeth) 320 disposed at four positions separated in the circumferential direction around the central axis AX. Each of the teeth 320 includes an arm portion 321 extending outward in the radial direction from the central axis, around which the coil 31 is wound, and a stretching portion 322 extending from the arm portion 321 outward in the radial direction and in the circumferential direction on both sides. More specifically, the stator core 32 is made of a plurality of electromagnetic steel sheets laminated in the direction of the central axis AX. Each of the electromagnetic steel sheets has a ring-like portion and four portions extending radially from the outer edge of the ring-like portion at four parts separated from each other in the circumferential direction with intervals of 90 degrees so as to constitute the above-mentioned teeth 320. The ring-like portions are laminated to form a cylindrical portion of the stator core 32, which is fixed to the outer surface of the cylindrical portion 121 of the base portion 12 constituting the housing 1, so that the stator including the stator core 32 is fixed to the base portion 12 of the housing 1.

In addition, the stator core 32 is covered with insulators 33 made of resin, which are attached to the stator core 32 from both sides in the axial direction, and the coils 31 are wound on the insulators 33. The outer circumferential surface of the stator core 32 (the stretching portions 322 thereof) has exposed edge surfaces of the electromagnetic steel sheets. Note that the internal diameter of a center opening 331 at the distal end of the insulator 33 of the distal end side in the axial direction is a little smaller than the outside diameter of the dropout protection ring 24 fixed to the rotating shaft 21. Therefore, the distal end portion of the insulator 33 works also as a stopper for the dropout protection ring 24.

The brushless motor 2 for the cooling fan of this preferred embodiment preferably is a two-phase half-wave (or a single-phase full-wave) motor having four poles and four slots. As described above, the stator core 32 is preferably provided with four teeth 320, and the Hall IC 34 is located at one of the four slots (between the neighboring teeth). Actually, a circuit board 35 having a substantially ring-like shape is located on the proximal end side of the stator core 32 and fixed to the base portion 12 of the housing 1 together with the stator core 32, and the Hall IC 34 is mounted on the circuit board 35.

A driving circuit including a drive IC for the brushless motor 2 is also mounted on the circuit board 35. In addition, lead wires of the coil 31 wounded around the stator core 32 via the insulator 33 are connected to three metal pins 311 fixed to the insulator 33, which are connected to conductive patterns (lands for soldering) on the circuit board 35.

The Hall IC 34 is an integrated circuit including a Hall device for sensing a direction and intensity of a magnetic field based on an electromagnetic phenomenon called the Hall effect, an amplifying circuit and a waveform shaping circuit for the output signal thereof, which are housed in a rectangular solid plastic package. As shown in FIG. 3, the Hall IC 34 is mounted on the circuit board 35 at a notch portion 351 provided to a portion in the outer circumferential portion of the circuit board 35. Although the detail is not shown in FIG. 3, the Hall IC 34 is provided with three terminals including two terminals for power supply and one output terminal, which are connected to conductive patterns (lands for soldering) of the circuit board 35.

Note that the body of the Hall IC 34 sinks below the surface of the circuit board 35 at the notch portion 351 so that the height of the Hall IC 34 from the surface of the circuit board 35 can be reduced, which can contribute to reduction of a size (height) in the axial direction of the cooling fan. In addition, this mounting method of the Hall IC 34 is effective for exposing the Hall IC 34 at the distal end side of the circuit board 35 even if the proximal end side of the circuit board 35 is a mounting side for the component.

A small circular mark 341 in FIG. 3, which is slightly shifted from the center of the rectangle indicating the Hall IC 34, indicates a position of a sensor element of the Hall device included in the Hall IC 34. Hereinafter, it may be referred to as a sensor element 341. Here, the "sensor element" means a portion (or a point) that actually senses a magnetic field in the Hall device. As to the brushless motor 2 for the cooling fan of this preferred embodiment, the position of the sensor element 341 in the Hall IC 34 is optimized in accordance with a result of the experiment that will be described later for solving the problem due to a small size (slim shape) of the cooling fan as described above.

Figure 4:
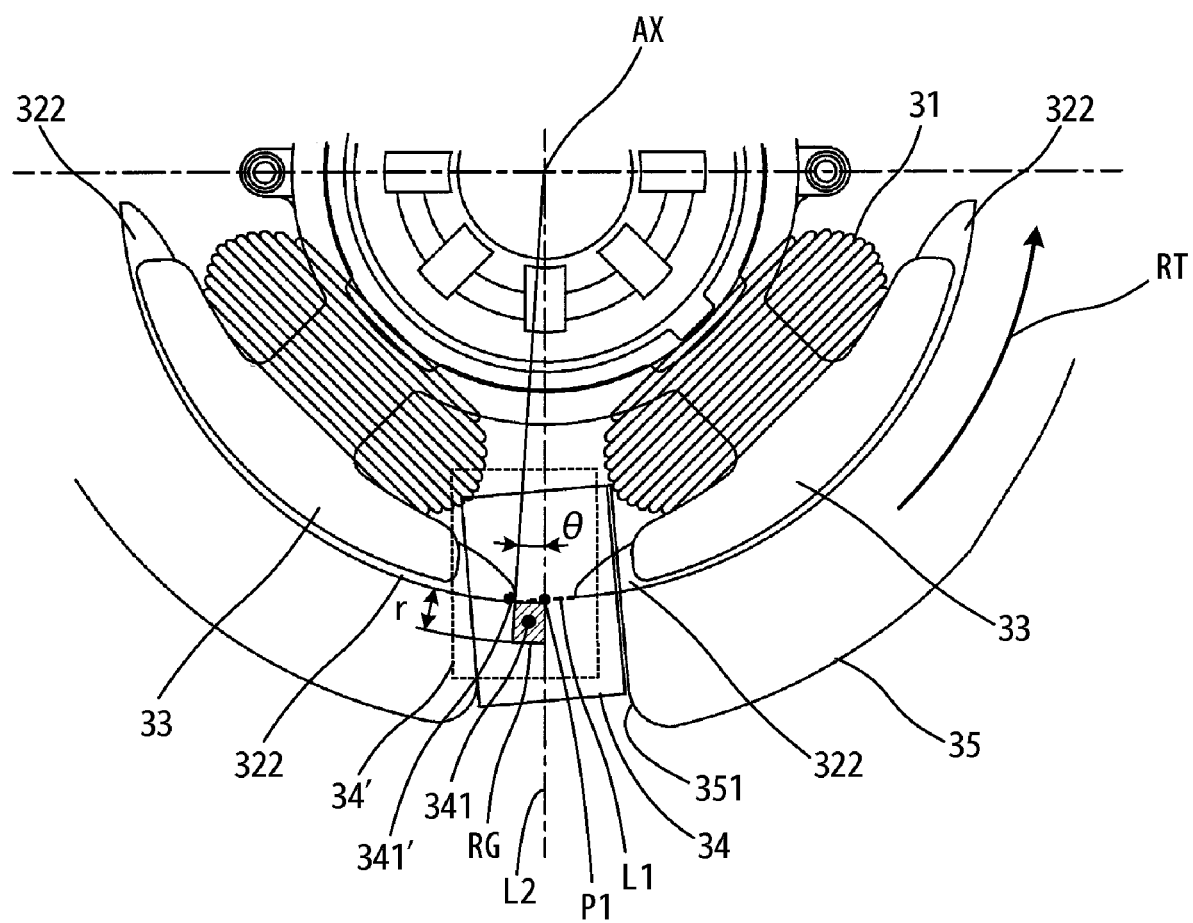
FIG. 4 is a partial enlarged diagram of FIG. 3 for showing a layout of a Hall IC in the stator unit.
Figure 5:
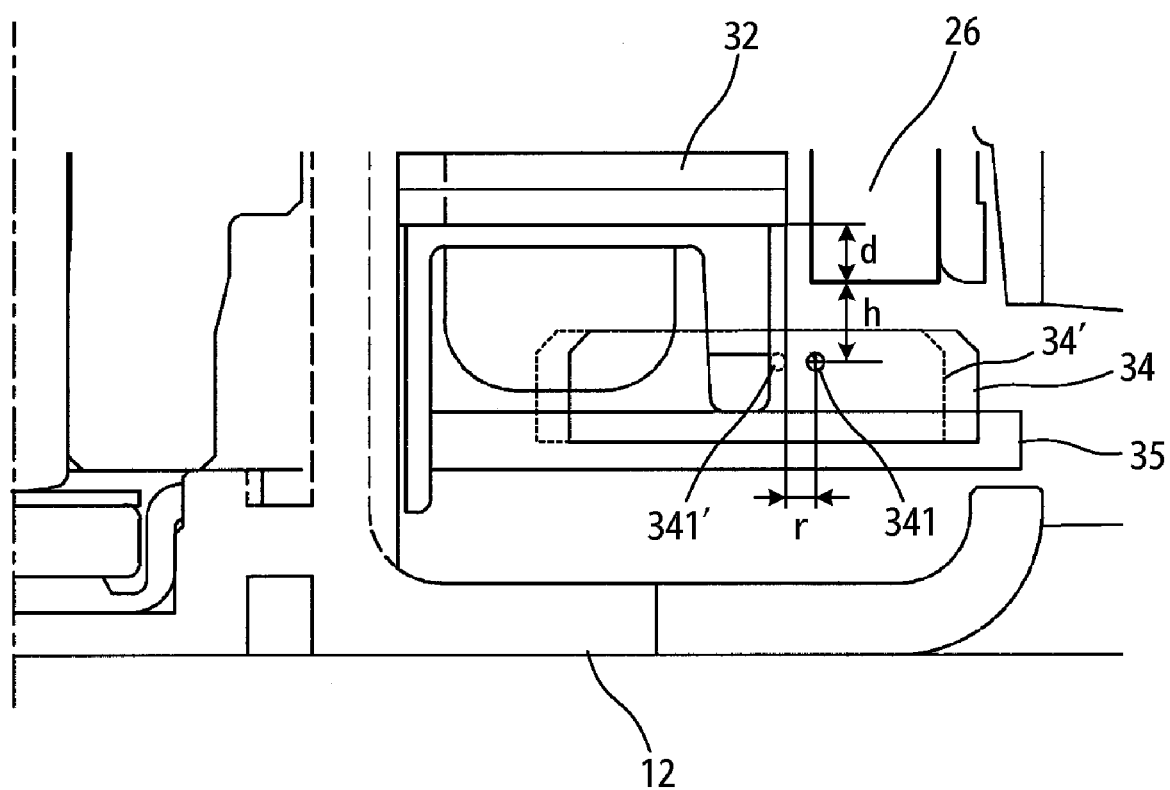
FIG. 5 is a partial enlarged diagram of FIG. 2 for showing a layout of the Hall IC in the stator unit.

Next, the optimized position of the sensor element 341 of the Hall IC 34 will be described with reference to FIGS. 4 to 8. FIG. 4 is a partial enlarged diagram of FIG. 3 and is a plan view showing a layout of the Hall IC 34 of the stator unit constituting the brushless motor 2. In addition, FIG. 5 is a partial enlarged diagram of FIG. 2 and is a cross section showing a layout of the Hall IC 34 of the stator unit constituting the brushless motor 2.

First, in the plan view shown in FIG. 4, the position of the sensor element 341 of the Hall IC 34 is optimized to be within the hatched range RG that is substantially rectangular. This range RG is defined as a range within an lead angle (mechanical angle) θ in the circumferential direction from a reference line L2 that is a line connecting the central axis AX and the point P1 in the radial direction, which bisects the line L1 connecting the neighboring stretching portions 322 of the teeth 320 of the stator core 32 in the circumferential direction as a shortest distance, and within a distance r outward from the arc connecting the outer edges of the neighboring stretching portions 322 with respect to the central axis AX as its center.

Here, the "lead angle" means an angle (not an electric angle but a mechanical angle) leading from the reference line in the direction (phase leading direction) opposite to the rotation direction of the rotor magnet (the angle shown by the arrow RT). Specific values of the lead angle θ and the distance r are θ=4 (degrees) and r=1 (millimeter), as described below. Note that the contour 34' shown by the broken line in FIGS. 4 and 5 indicates a position of the conventional Hall IC, and the position 341' of the sensor element thereof is outside the range RG.

First, in order to determine a value of the radial distance r, a Hall probe of a magnetic flux analyzer was set to the position corresponding to the sensor element 341 of the Hall IC 34 so as to measure a change in magnetic flux density obtained when it was moved in the radial direction. In this case, the position in the circumferential direction was fixed as θ=2 degrees, and the position (height) in the axial direction was a parameter in the measurement. A result of this measurement is shown as a graph in FIG. 6.

Figure 6:
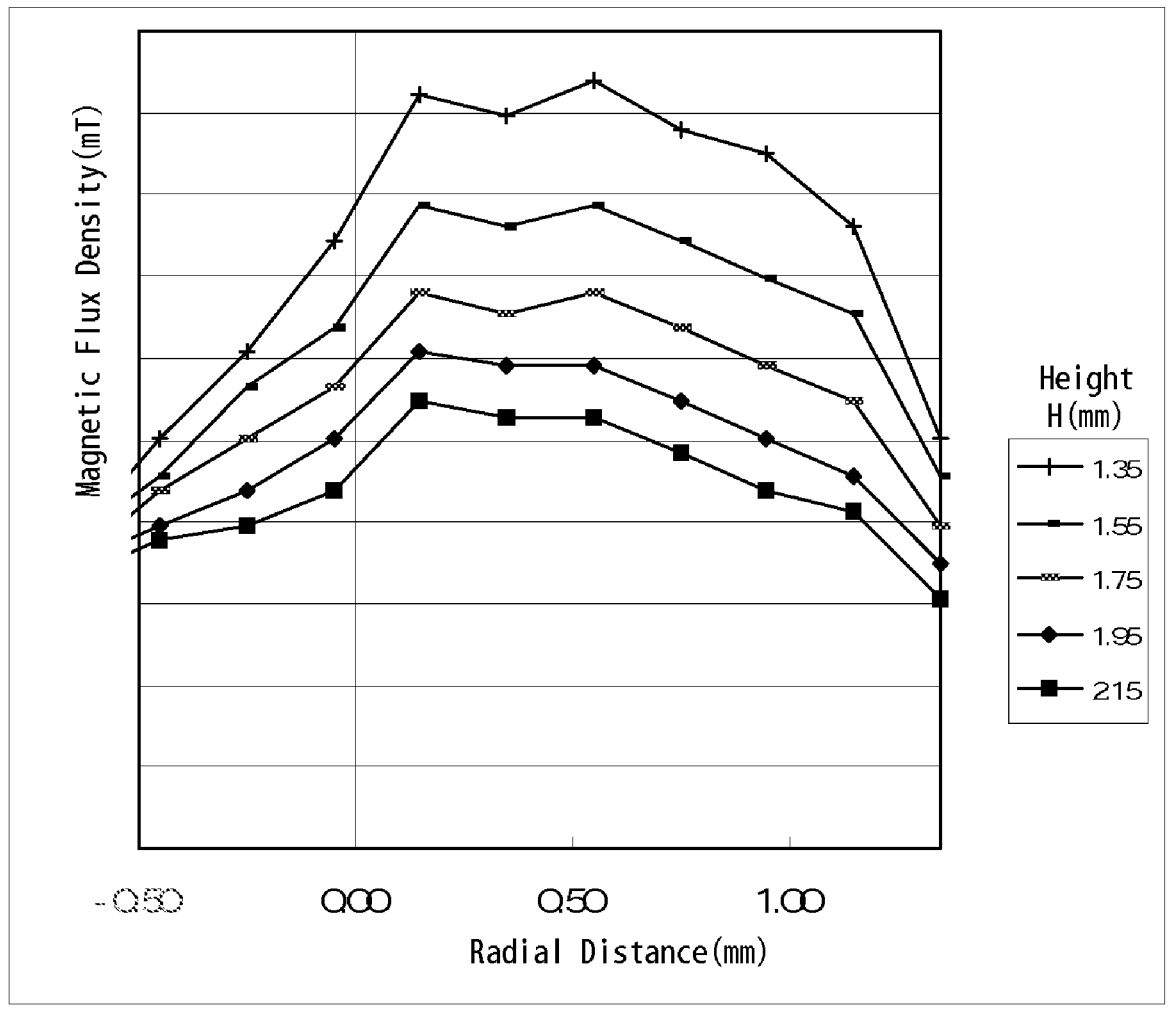
FIG. 6 is a graph showing a relationship between a radial position of the Hall IC in the stator unit and a magnetic flux density.

In the graph shown in FIG. 6, the horizontal axis represents a distance r in the radial direction corresponding to the sensor element 341 of the Hall IC 34. In addition, the position (height) H in the axial direction and a distance h shown in FIG. 5 (a distance between the end surface of the rotor magnet 26 in the axial direction and the sensor element 341) satisfies the relationship of "h=H+0.15 (millimeters). This relationship (conversion equation) is due to a convenience of measurement. In other words, the value of 0.15 millimeters corresponds to a distance between the surface of the Hall IC 34 and the sensor element 341 inside the Hall IC 34.

From the result of the measurement shown in FIG. 6, the following can be understood. First, as a matter of course, the obtained magnetic flux density decreases along with an increase of the position (height) H (=h−0.15) in the axial direction, i.e., along with an increase of the distance from the end surface of the rotor magnet 26. A desired magnetic flux density can be obtained within a range of a predetermined radial distance r if the distance is approximately H=1.85 (h=2.0) millimeters at most, in other words, if the distance h between the end surface of the rotor magnet 26 and the sensor element 341 of the Hall IC 34 in the axial direction is 2 millimeters or smaller.

Second, with respect to the position (height) H (h) in the axial direction as described above, a relatively large magnetic flux density can be obtained within the range of r=0 to 1 millimeter. In other words, if the distance r is smaller than approximately 0 millimeter or larger than approximately 1 millimeter, the magnetic flux density obtained at each value of the height H drops steeply.

Therefore, it is determined that the sensor element 341 of the Hall IC 34 should be located within the range of r=0 to 1 millimeter, i.e., the range within 1 millimeter outward from the arc connecting the outer edges of the neighboring stretching portions 322 with respect to the central axis AX as its center.

Next, in order to determine a value of the lead angle θ in the circumferential direction, the lead angle θ was changed while the magnetic flux density was measured by using the magnetic flux analyzer in the same manner as described above. Note that the position r in the radial direction and the height h in the axial direction are fixed as r=0 millimeter and h=1.1 millimeters in the measurement. A result of this measurement is shown in FIG. 7 as a graph.

Figure 7:
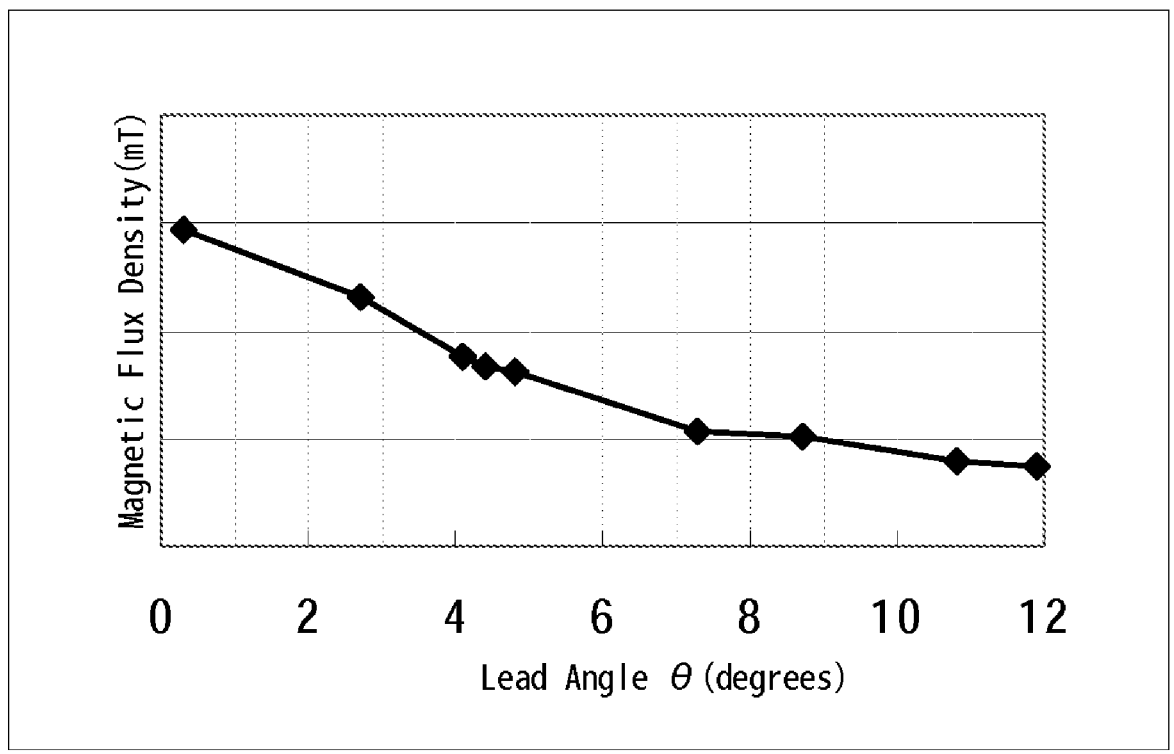
FIG. 7 is a graph showing a relationship between a lead angle as a circumferential position of the Hall IC in the stator unit and the magnetic flux density.

As understood from the result of the measurement shown in FIG. 7, the obtained magnetic flux density decreases along with an increase in the lead angle (degrees). If sufficient magnetic flux density cannot be obtained, the sensor element 341 of the Hall IC 34 cannot sense correctly the magnetic flux generated by the stator core 32. Then, it is difficult for the drive IC to switch correctly current to be supplied to the stator (coils) of the brushless motor 2 based on a digital signal output from the Hall IC 34. A value of the lead angle θ is determined temporarily to be four degrees (or smaller) based on the result of the measurement shown in FIG. 7, and the following study and experiment are performed.

When the appropriate position of the sensor element 341 of the Hall IC 34 is determined as described above, not only the distance h from the end surface of the rotor magnet 26 in the axial direction but also the distance (d+h) from the end surface of the stator core 32 in the axial direction exerts an influence upon the position (height) in the axial direction (see FIG. 5). In other words, the distance d between the end surface of the rotor magnet 26 in the axial direction on the Hall IC 34 side and the end surface of the stator core 32 in the axial direction on the Hall IC 34 side exerts an influence upon optimization of a position of the sensor element 341 of the Hall IC 34 in the axial direction.

If the distance d is sufficiently large, the magnetic flux from the end surface of the rotor magnet 26 in the axial direction is not pulled by the stator core 32 but is apt to pass through the sensor element 341 of the Hall IC 34 so that the Hall IC 34 can sense the magnetic field of the rotor magnet 26 correctly. As described above, however, it is difficult to secure a sufficient value of the distance d in the motor of the slim cooling fan having a small axial dimension (thickness) like this preferred embodiment. If the distance d is about 2 millimeters or less, for instance, it is necessary to determine the position of the sensor element 341 of the Hall IC 34 more appropriately.

Therefore, a relationship between the lead angle θ and the magnetic flux density was measured by using the magnetic flux analyzer, while the distance d is changed as a parameter step by step from 0 millimeter to about 1.6 millimeters within the range of the position of the sensor element 341 of the Hall IC 34 determined as described above. The lead angle θ was altered from 0 to 6 degrees. In addition, the measurement was performed for both the non-energized state of the stator in which current is not supplied to the coil and the energized state in which current is supplied to the coil. In the energized state, a current of 0.2 amperes was supplied to one of two phase coils that is closer to the Hall IC 34. In addition, the position r in the radial direction and the height h in the axial direction are fixed as r=0 millimeter and h=1.18 millimeters in the measurement. A result of this measurement is shown in FIGS. 8A and 8B as graphs.

Figure 8A:
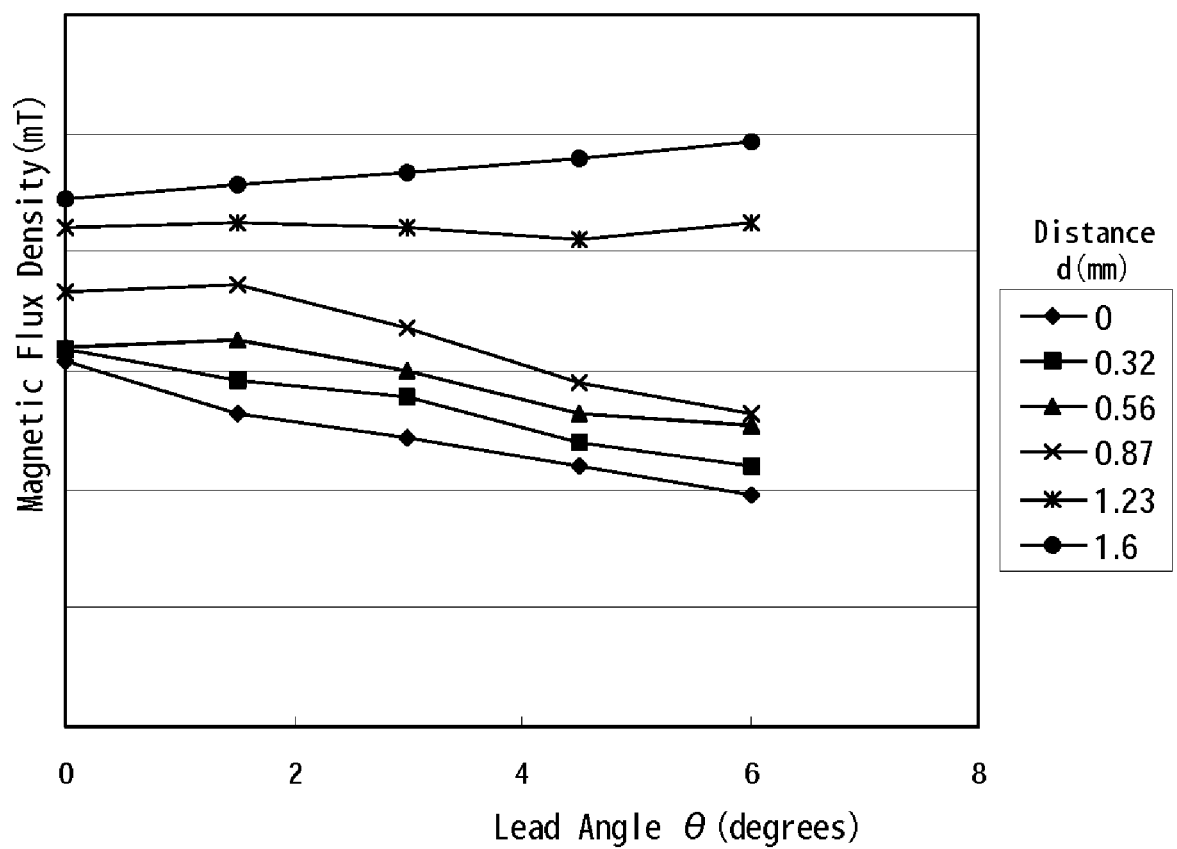
FIGS. 8A and 8B are graphs showing a relationship between the lead angle as the circumferential position of the Hall IC in the stator unit and the magnetic flux density, in which a distance between end surfaces of the rotor magnet and the stator core in the axial direction is changed as a parameter.
Figure 8B:
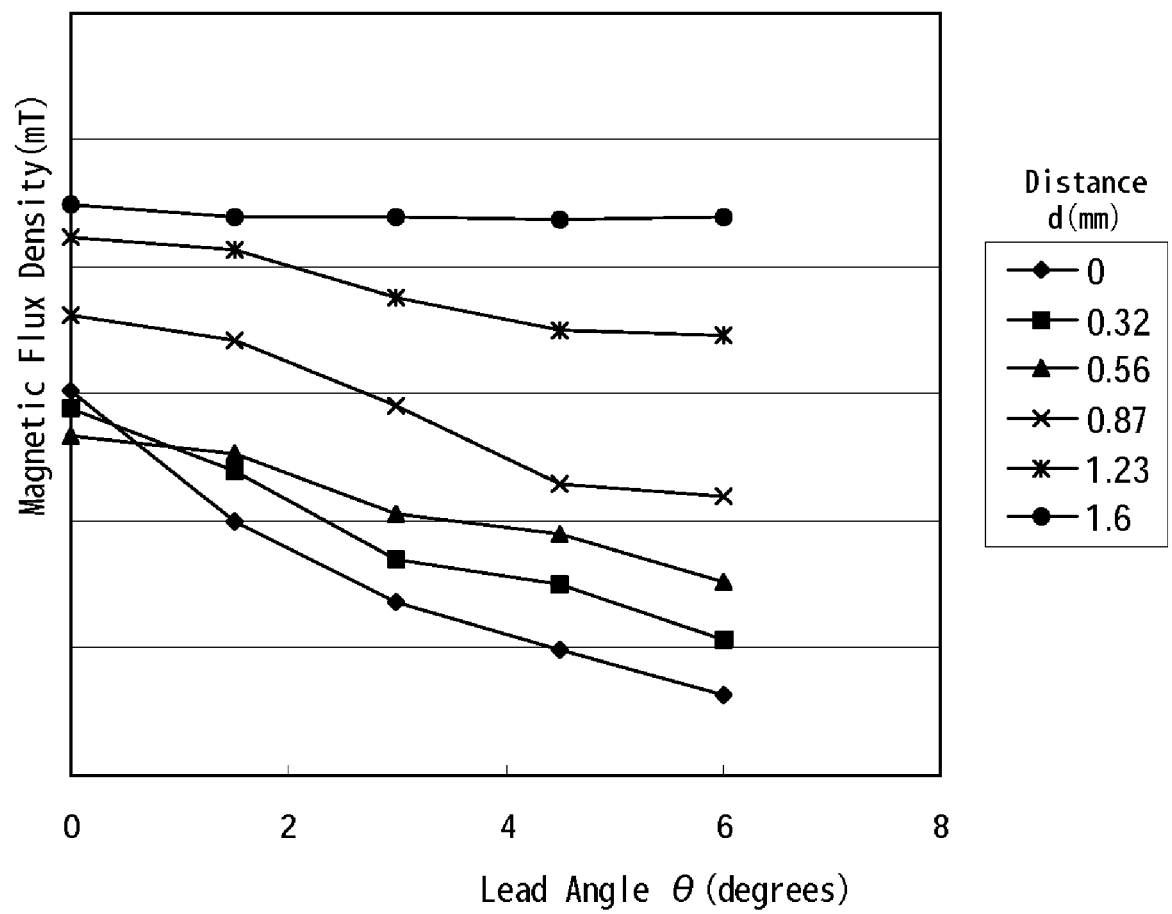

FIGS. 8A and 8B are graphs showing data as the measurement results in the non-energized state and in the energized state, respectively. In each graph, the horizontal axis represents the lead angle θ while the vertical axis represents the obtained magnetic flux density. In addition, the distance d is changed as a parameter, and a relationship between the lead angle θ and the magnetic flux density is plotted for each value of the distance d.

The following can be understood from the graphs shown in FIGS. 8A and 8B. Comparing FIG. 8A with FIG. 8B, it is understood that the obtained magnetic flux density is lower in the energized state (FIG. 8B) than in the non-energized state (FIG. 8A). This means that a quantity of the magnetic flux pulled by the stator core 32 from the rotor magnet 26 is larger in the energized state so that the magnetic flux density that can be sensed by the Hall IC 34 is lower than in the non-energized state. In addition, similarly to the graph shown in FIG. 7, there is a tendency that the obtained magnetic flux density decreases along with an increase of the lead angle. This tendency becomes conspicuous as the distance d decreases. In other words, as the distance d between the end surface of the rotor magnet 26 in the axial direction on the Hall IC 34 side and the end surface of the stator core 32 in the axial direction on the Hall IC 34 side becomes smaller, the gradient of the decreasing magnetic flux density with respect to the increase of the lead angle becomes larger. In addition, the gradient is larger in the energized state than in the non-energized state.

Although the distance d is changed step by step from 0 to 1.6 millimeters in this experiment, it is assumed from FIGS. 8A and 8B that if the distance d becomes approximately 2.0 millimeters, the gradient of the decreasing magnetic flux density with respect to the increase of the lead angle further decreases so that the influence of the stator core 32 in the energized state becomes smaller. It can be decided from the graphs shown in FIGS. 8A and 8B that the magnetic flux densities obtained in the non-energized state and in the energized state within the range of the distance d from 0 to about 1.6 millimeters (or from 0 to about 2.0 millimeters) and the lead angle θ from 0 to about 4 degrees are within a practical range without a problem.

As described above, the sensor element 341 of the Hall IC 34 is positioned in the range within the lead angle θ of 4 degrees or smaller and the radial direction distance r of about 1 millimeter or smaller as for the brushless motor of the slim cooling fan having the distance d of about 2 millimeters or smaller, so that the magnetic flux (magnetic field) from the rotor magnet 26 can be sensed correctly by the Hall IC 34. In addition, concerning the position in the axial direction, the distance between the end surface of the rotor magnet 26 in the axial direction on the Hall IC 34 side and the sensor element 341 of the Hall IC 34 is preferably set to a value of about 2 millimeters or smaller, so that the Hall IC 34 can sense the magnetic flux (magnetic field) from the rotor magnet 26 more correctly. Thus, the drive IC can switch current to be supplied to the stator (coils) of the brushless motor 2 correctly based on the digital signal output from the Hall IC 34.

Although the preferred embodiments of the present invention are described above, the brushless motor and the cooling fan of the present invention are not limited to those of the preferred embodiments described above. The present invention can be embodied in various forms.

For instance, although the Hall IC 34 in which the Hall device is embedded is preferably used as the position sensor for sensing a change in magnetic flux due to rotation of the rotor magnet in the embodiment described above, the present invention can also be applied to the case where the Hall device is used as the position sensor. In this case, the sensor element means the center portion inside the Hall device that senses the magnetic field by the Hall effect. In addition, the present invention can also be applied to the case where the Hall device is embedded in the motor drive IC. In this case, it can be regarded that the motor drive IC corresponds to the position sensor (or includes the position sensor).

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A brushless motor comprising:
   a stator unit disposed around a central axis;
   a rotor unit disposed in a rotatable manner relatively to the stator unit so as to rotate around the central axis;
   the rotor unit including a substantially cylindrical rotor magnet and a rotor holder having a cylindrical portion arranged to retain an outer circumferential portion of the rotor magnet;
   the stator unit including a stator core around which coils are wound and a circuit board on which circuit components defining a circuit to supply drive current to the coils are mounted;
   the circuit board including a position sensor arranged to sense a change in magnetic flux due to rotation of the rotor magnet; and
   the stator core includes teeth disposed at positions separated in the circumferential direction, each of which has an arm portion extending outward in the radial direction from the central axis, around which the coil is wound, and a stretching portion extending from the arm portion outward in the radial direction and in the circumferential direction on both sides; wherein
   the position sensor includes a sensor element that is positioned in the range within the lead angle of about four degrees or less in the circumferential direction from a reference line radially connecting the central axis and a point bisecting a line connecting neighboring stretching portions in the circumferential direction as a shortest distance, and within a distance of about one millimeter or less outward in the radial direction from an arc connecting outer edges of the neighboring stretching portions with respect to the central axis.

2. The brushless motor according to claim 1, wherein the number of the teeth is four.

3. The brushless motor according to claim 1, wherein a difference between an end surface of the rotor magnet in the axial direction on the position sensor side and an end surface of the stator core in the axial direction on the position sensor side is about two millimeters or less.

4. The brushless motor according to claim 3, wherein the end surface of the rotor magnet in the axial direction on the position sensor side is closer to the position sensor than the end surface of the stator core in the axial direction on the position sensor side is.

5. The brushless motor according to claim 1, wherein a distance between the end surface of the rotor magnet in the axial direction on the position sensor side and the sensor element of the position sensor is about two millimeters or less.

6. The brushless motor according to claim 1, wherein a Hall device or a Hall IC in which the Hall device is embedded is used as the position sensor.

7. A cooling fan comprising:
   the brushless motor according to claim 1;
   an impeller fixed to an outer surface of the rotor holder; and
   a housing including a base portion arranged to support an end of the brushless motor in the axial direction and a cylindrical portion surrounding the impeller.

8. The cooling fan according to claim 7, wherein a height of the cooling fan in the axial direction is about 15 millimeters or less.

* * * * *